(12) United States Patent
Capdevielle et al.

(10) Patent No.: US 9,572,071 B2
(45) Date of Patent: Feb. 14, 2017

(54) AUTONOMOUS DETERMINATION OF OPTIMAL VALUES FOR HANDOVER PARAMETERS

(71) Applicant: Alcatel Lucent, Boulonge Billancourt (FR)

(72) Inventors: Veronique Capdevielle, Magny les Hameaux (FR); Afef Feki, Antony (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/436,279

(22) PCT Filed: Oct. 15, 2013

(86) PCT No.: PCT/EP2013/071498
§ 371 (c)(1),
(2) Date: Apr. 16, 2015

(87) PCT Pub. No.: WO2014/060396
PCT Pub. Date: Apr. 24, 2014

(65) Prior Publication Data
US 2015/0289169 A1    Oct. 8, 2015

(30) Foreign Application Priority Data

Oct. 18, 2012 (EP) .................... 12306292

(51) Int. Cl.
*H04W 36/00* (2009.01)
*H04W 24/02* (2009.01)

(52) U.S. Cl.
CPC ......... *H04W 36/0005* (2013.01); *H04W 24/02* (2013.01); *H04W 36/0083* (2013.01); *H04W 36/0094* (2013.01)

(58) Field of Classification Search
CPC ............ H04W 24/02; H04W 36/0005; H04W 36/0083; H04W 36/0094
(Continued)

(56) References Cited

U.S. PATENT DOCUMENTS 8,364,141 B1 * 1/2013 Kateley ................. H04W 24/08
370/216

OTHER PUBLICATIONS

Sung Kyung Kim et al., "A adaptive handover decision algorithm based on the estimating mobility from signal strength measurements," 2004 IEEE 60$^{th}$ Vehicular Technology Conference, vol. 2, pp. 1004-1008, XP010786773, Sep. 26, 2004.
(Continued)

*Primary Examiner* — Charles Shedrick
(74) *Attorney, Agent, or Firm* — Fay Sharpe, LLP (57) ABSTRACT

The present invention relates to a method for adjusting handover parameters (TTT; OFF) used for handover detection within a given serving cell (CS). In accordance with an embodiment of the invention, the method comprises, for respective ones of a plurality of mobile stations (UE1 ... UEN) served by the serving cell, gathering measurement samples (M(i,CS,k); M(i,CN,k)) of the serving cell and of a respective neighboring cell (CN) carried out by a respective mobile station (UEi) at successive time instances (k), and determining delta values ($\Delta$(i,CN,k)) indicative of the time-indexed difference between respective ones of the measurement samples of the serving cell and corresponding ones of the measurement samples of the neighboring cell. The method further comprises determining near-optimal values ($TTT_{NO}$; $OFF_{NO}$) for the handover parameters by statistical characterization of the ensembles of delta values for the plurality of mobile stations. The near-optimal values may be input to an iterative closed-loop optimization algorithm in order to determine optimal values ($TTT_O$; $OFF_O$) for the
(Continued)

handover parameters. The present invention also relates to a handover configuration agent (150) implementing the proposed method.

18 Claims, 5 Drawing Sheets

(58) Field of Classification Search
USPC .......................... 455/436–444; 370/331, 216
See application file for complete search history.

(56) References Cited

OTHER PUBLICATIONS

Huawei, "Addressing the requirements for HO optimization," $3^{rd}$ Generation Partnership Project (3GPP), 3GPP TSG-SA5 (Telecom Management) Meeting SA5#61, S5-081672, pp. 1-9, XP050335753, Dalian, China, Oct. 13-17, 2008.

Veronique Capdevielle et al., "Joint Interference Management and Handover Optimization in LTE Small Cells Network," 2012 IEEE International Conference on Communications, pp. 6769-6773, XP032274608, Jun. 10, 2012.

Shih-Fan Chou et al., "An Efficient Measurement Report Mechanism for Long Term Evolution Networks," 2011 IEEE $22^{nd}$ International Conference on Personal Indoor and Mobile Radio Communications, pp. 197-201, XP032102258, Sep. 11, 2011.

International Search Report for PCT/EP2013/071498 dated Nov. 13, 2013.

* cited by examiner

AUTONOMOUS DETERMINATION OF OPTIMAL VALUES FOR HANDOVER PARAMETERS

TECHNICAL FIELD OF THE INVENTION

The present invention relates to mobility within a mobile or wireless network, and more specifically to the configuration of handover parameters used for detecting that a given neighboring cell fulfills a given handover condition within a given serving cell.

TECHNICAL BACKGROUND OF THE INVENTION

Supporting mobility with steady quality is a requirement for 4th generation (4G) networks and beyond. To this end, handover is a key Radio Resource Management (RRM) technique that ensures service continuity while a user is moving across radio cells by changing attachment of a user terminal from one cell to another more suitable cell, thereby enhancing the user experience and the overall network performances (lower power consumption, lower radio interference, etc).

However, the handover procedure is performed upon triggering conditions which have to be properly configured and optimized so that target Quality of Service (Qos) and Quality of Experience (QoE) objectives are achieved.

Indeed, an efficient design and optimization of the handover procedure shall meet the following requirements:
minimizing Radio Link Failures (RLF) and call drops during handover procedures; while
minimizing the number of unnecessary handovers; and
maximizing the duration of user connection to the best cell.

To illustrate this, let's consider the two following scenarios.
A handover that is triggered too lately leads to RLF in the source cell: the user keeps attached to its serving cell while moving outside the cell radio coverage.
Conversely, a handover that is launched too early leads to erroneous decisions: useless handover decision to a new cell, and then reconnection to the original serving cell (ping-pong handovers), or erroneous selection of a new target cell.

So, it is easy to understand that it is crucial to achieve a fine-adjustment of the handover parameter values in order to trigger a handover when appropriate, and towards a properly selected target cell. When appropriate and towards a properly selected target cell means that the following trade-off between the following—and somehow contradictory—goals is met: minimizing the duration before detection, that is to say the duration between the instant of an effective change (e.g., target cell gets offset-better than current serving cell) and the decision to trigger a handover, while minimizing false handover alarms (i.e., erroneous handover decisions).

In 3rd Generation Partnership Project (3GPP) standard development, the Mobility Robustness Optimization (MRO) feature aims at first detecting and counting RLFs due to handovers, then to find solutions to reduce handover performances degradation.

MRO distinguishes three handover failure cases:
[Too Late HO] A connection failure occurs in the source cell before the handover was initiated, or during a handover; the User Equipment (UE) attempts to re-establish the radio link connection in the target cell (if handover was initiated) or in a cell that is not the source cell (if handover was not initiated).
[Too Early HO] A connection failure occurs shortly after a successful handover from a source cell to a target cell, or during a handover; the UE attempts to re-establish the radio link connection in the source cell.
[HO to Wrong Cell] A connection failure occurs shortly after a successful handover from a source cell to a target cell or during a handover; the UE attempts to re-establish the radio link connection in a cell other than the source cell and the target cell.

In 3GPP Long Term Evolution (LTE) standard, handover is performed as following. The user performs periodic measurements, typically filtered Reference Signal Received Powers (RSRP) on the serving (Ms) and neighbor cells (Mn). When a given handover condition is met (typically an A3 event) for a particular neighboring cell, the UE reports its measurements to the serving cell, which eventually decides to trigger or not a handover based on the user's recommendations.

Basically, A3 event reporting by the UE is triggered if at least one neighbor cell becomes better than the serving cell by a configurable offset value. Handover reporting measurement by the UE is triggered if the condition is met for a minimal configurable duration or Time-To-Trigger (TTT).

Particularly in dense networks of small cells (but not only), it is important to reduce the time for operators to manage a wide set of cell and handover parameters in particular. It is also worthwhile to state that the automatic configuration and optimization of cell and handover parameters is a key feature for 4G networks, especially for dense networks.

We propose a solution to enable each cell, in a distributive and fully autonomous way, to jointly adjust the major handover parameters so as to achieve a near-optimal trade-off between minimizing the probability of late handover decisions (rate of Too Late HO) while minimizing the risk of false alarms (rate of Too Early HO and HO to Wrong Cell).

To the best of our knowledge, there is no solution to jointly optimize the handover parameters.

In the article entitled "*A Cost-based Adaptive Handover Hysteresis Scheme to Minimize the Handover Failure Rate in* 3*GPP LTE System*" from D-W Lee, G-T Gil and D-H Kim, and published in July 2010 in the EURASIP Journal on Wireless Communications and Networking, the hysteresis parameter is iteratively adjusted (increased/decreased) so as to minimize handover failure rate, accounting for neighbor cells load, the user speed or the traffic type.

In the conference paper entitled "*Handover Parameter Optimization in LTE Self-Organizing Networks*" from T. Jansen, I. Balan & al published in September 2010 during the IEEE 72nd Vehicular Technology Conference in Ottawa (Canada), the operating point (Hysteresis or HO Margin, Time-To-Trigger) is adjusted in an iterative way in order to minimize handover related QoS like handover failure ratio, ping-pong (oscillation) rates or call dropping rates. The adjustment path is set-up according to the experienced performances compared to target ones. Although practical, the empirical solutions lack theoretical basis for solving the trade-off introduced here above.

In the conference paper entitled "A Novel Self-optimizing Handover Mechanism for Multi-Service provisioning in LTE-Advanced" from H. Zhang, X. Wen & al published in 2009 during Research Challenges in Computer Science ICRCCS '09 conference, the authors tune hysteresis, Time-To-Trigger and filtering parameters so that the number of handovers gets close to the number of cells boundary crossings. Though novel, this approach does not rely on handover counters specified by 3GPP through MRO feature, which makes its application in real networks difficult.

In the lecture notes entitled "Distributed Self-Optimization of Handover for the Long Term Evolution" from A. Schröder, H. Lundqvist and G. Nunzi published in 2008 in Computing Science, Volume 5343/2008, p. 281-286, the authors presents a trial and error loop method to optimize one or more handover parameters.

SUMMARY OF THE INVENTION

It is an object of the present invention to provide an efficient and autonomous way for determining optimal values for handover parameters.

In accordance with a first aspect of the invention, a method for adjusting handover parameters used for handover detection within a given serving cell comprises, for respective ones of a plurality of mobile stations served by the serving cell, gathering measurement samples of the serving cell and of a respective neighboring cell carried out by a respective mobile station at successive time instances, and determining delta values indicative of the time-indexed difference between respective ones of the measurement samples of the serving cell and corresponding ones of the measurement samples of the neighboring cell. The method further comprises determining near-optimal values for the handover parameters by statistical characterization of the ensembles of delta values for the plurality of mobile stations.

In accordance with another aspect of the invention, a configuration agent for adjusting handover parameters used for handover detection within a given serving cell is adapted, for respective ones of a plurality of mobile stations served by the serving cell, to gather measurement samples of the serving cell and of a respective neighboring cell carried out by a respective mobile station at successive time instances, and to determine delta values indicative of the time-indexed difference between respective ones of the measurement samples of the serving cell and corresponding ones of the measurement samples of the neighboring cell. The configuration agent is further adapted to determine near-optimal values for the handover parameters by statistical characterization of the ensembles of delta values for the plurality of mobile stations.

The configuration agent may form part of either a radio access node, such as an evolved NodeB (eNB), a radio access controller, such as a Base Station Controller (BSC) or a Radio Network Controller (RNC), or a network manager.

In one embodiment of the invention, the near-optimal values are input to an iterative closed-loop optimization algorithm in order to determine optimal values for the handover parameters.

In one embodiment of the invention, the iterative closed-loop optimization algorithm is based on a Simulated Annealing (SA) algorithm.

In one embodiment of the invention, the measurement samples are indicative of the respective strengths of pilot signals received by the respective mobile stations from the respective serving and neighboring cells.

In one embodiment of the invention, the measurement samples are indicative of the respective qualities of pilot signals received by the respective mobile stations from the respective serving and neighboring cells.

In one embodiment of the invention, the plurality of mobile stations belongs to a particular speed class, and the near-optimal values for the handover parameters are determined on per speed class basis.

In one embodiment, the statistical characterization of the ensembles of delta values for the plurality of mobile stations involves the characterization of variances of the delta values for respective ones of the plurality of mobile stations over varying time windows.

This embodiment is particularly helpful for determining the near-optimal values for TTT and/or offset handover parameters.

In one embodiment of the invention, the method further comprises, for respective ones of the plurality of mobile stations, and from a given time index onwards, estimating variance values over a time-window of K successive delta values for respective increasing K values, and determining a minimum time-window length beyond which the so-determined variance values lies within a given small interval. The method further comprises determining a Time-To-Trigger TTT value, during which measurement samples of the serving cell and a given target cell shall fulfill the handover condition before triggering a handover, by statistical characterization of the so-determined minimum time-window lengths for the plurality of mobile terminals.

Similarly, the configuration agent is further adapted, for respective ones of the plurality of mobile stations, and from a given time index onwards, to estimate variance values over a time-window of K successive delta values for respective increasing K values, and to determine a minimum time-window length beyond which the so-determined variance values lies within a given small interval. The configuration agent is further adapted to determine a Time-To-Trigger TTT value, during which measurement samples of the serving cell and a given target cell shall fulfill a given handover condition, by statistical characterization of the so-determined minimum time-window lengths for the plurality of mobile terminals.

In one embodiment of the invention, the so-determined TTT value is such that a given proportion of the so-determined minimum time-window lengths for the plurality of mobile stations are lower than or equal to the TTT value.

In one embodiment of the invention, the method further comprises determining a nominal variance value by statistical characterization of the so-estimated variance values, and inputting the so-determined nominal variance value, along with a first upper bound for a handover detection time and a second upper bound for a false handover detection rate, to a Page Hinkley statistical test so as to determine an offset value whereby the target cell shall be measured offset-better than the serving cell for the handover condition to be fulfilled.

Similarly, the configuration agent is further adapted to determine a nominal variance value by statistical characterization of the so-estimated variance values, and inputting the so-determined nominal variance value, along with a first upper bound for a handover detection time and a second upper bound for a false handover detection rate, to a Page Hinkley statistical test so as to determine an offset value whereby the target cell shall be measured offset-better than the serving cell for the handover condition to be fulfilled.

In one embodiment of the invention, the nominal variance value is determined such that a further given proportion of the variance values estimated for the plurality of mobile stations over time-windows of lengths equal to the TTT value are lower than or equal to the nominal variance value.

In one embodiment of the invention, the determination of the offset value is instantiated on a per neighboring cell basis, and the first upper bound is adjusted based on an inter-site distance between the serving cell and a given neighboring cell and based on the particular speed class.

The proposed solution relies on theoretical framework to jointly estimate the handover parameters based on handover counters specified by the MRO feature in 3GPP specification. This has the advantage to enable easy and direct implementation in real networks.

More specifically, the joint optimization of the following HO parameters is targeted:

TTT parameter is directly linked to the performances of the L3 filtering operation. Indeed, the TTT criterion checks that the condition on L3 filtered measurements is persistent over a time window of duration TTT.

Offset parameter has to be configured so as to minimize the delay R before the effective triggering of handovers, while avoiding useless or erroneous handover attempts.

We propose in this invention a procedure aimed at a joint optimization and set up of TTT and Offset handover parameters. The proposed scheme here relies on a two-stage procedure where the first stage is a learning (or sensing) phase to find out near-optimal values for the handover parameters by statistical characterization of the measurement samples gathered from the mobile stations, and the second stage is an optimization stage to fine-tune the handover parameter values by means of an iterative closed-loop algorithm, starting from the near optimal values output from the first stage. However, in each step, only one parameter is considered, which makes the optimization less efficient in real networks.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
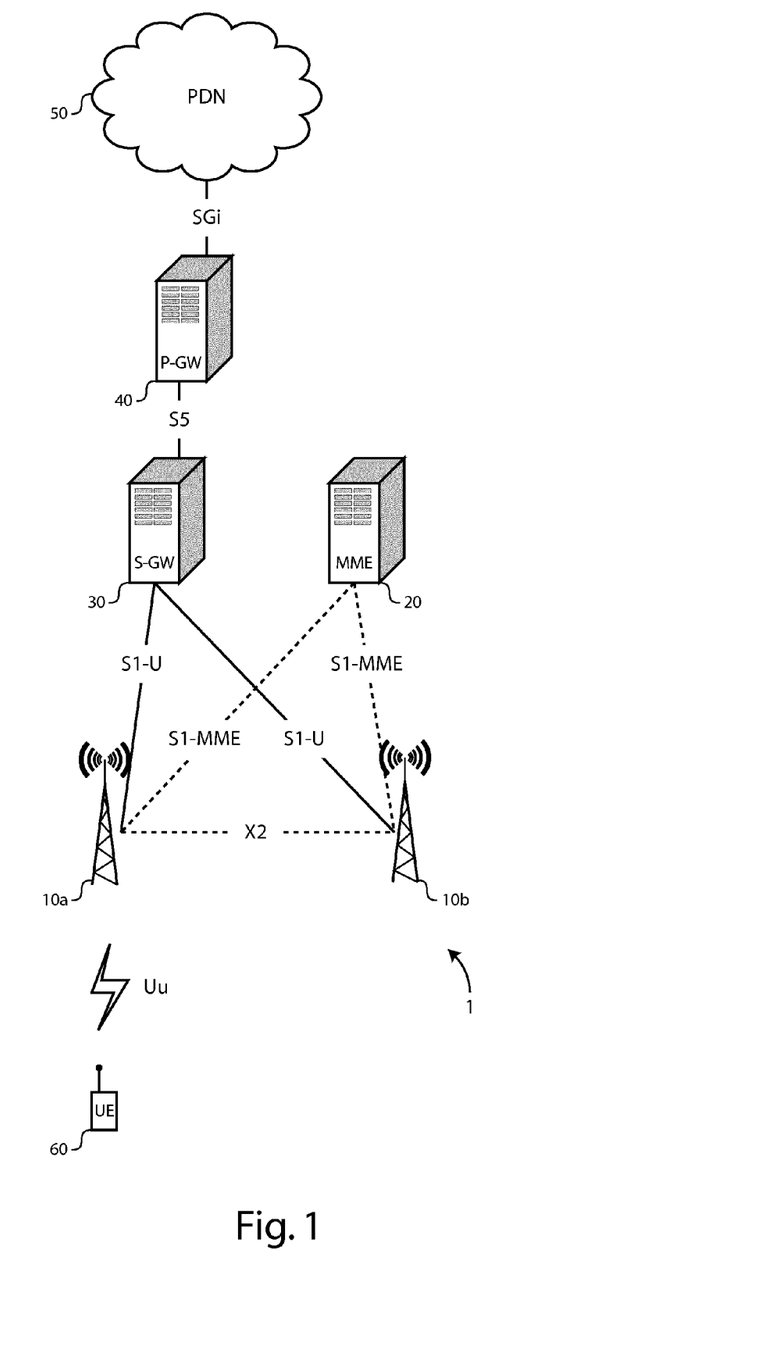
FIG. 1 represents a part of a mobile network as per the LTE standard.

There is seen in FIG. 1 a part 1 of an Evolved Radio Access Network (E-RAN) and of an Evolved Packet Core (EPC) comprising the following network elements:
eNBs 10;
an MME 20;
a Serving Gateway (S-GW) 30;
a Packet Data Network (PDN) Gateway (P-GW) 40; and
UEs 60.

The eNBs 10 are coupled to the MME 20 through an S1-MME interface, and to the S-GW 30 through an S1-U interface. The S-GW 30 is further coupled to the P-GW 40 through an S5 interface. The P-GW 40 is further coupled to a PDN 50 through an SGi interface. The neighboring eNBs 10 establish neighbor relationships through an X2 interface.

The eNBs 10 operate macro, micro or pico cells with a radio coverage area ranging from a few kilometers up to a few tens meters. The eNBs 10 are configured to set up and operate radio communication channels (i.e., a set of downlink and uplink traffic radio resources) with the UEs 60 through a Uu radio interface.

More noticeably, each of the eNBs 10 hosts the following functions:

Radio Resource Control (RRC): radio bearer control, radio admission control, connection mobility control, dynamic allocation of resources to UEs in both uplink and downlink (scheduling);

Routing of user-plane data towards the S-GW;

Scheduling and transmission of paging messages from the MME;

Scheduling and transmission of broadcast information;

Measurement and measurement reporting configuration for mobility and scheduling.

The MME 20 hosts the following functions:

Non Access Stratum (NAS) signaling;

Idle mode UE reachability, including control and execution of paging retransmission;

Tracking Area (TA) list management for UE in idle and active mode;

S-GW selection;

MME selection for inter-MME handovers;

Roaming;

Authentication;

Bearer management functions including dedicated bearer establishment.

The S-GW 30 hosts the following functions:

Local mobility anchor point for inter-eNB handover;

E-UTRAN idle mode downlink packet buffering and initiation of network triggered service request procedure;

Lawful interception;

Packet routing and forwarding;

Transport level packet marking in the uplink and the downlink;

downlink and uplink charging per UE, PDN, and Quality of Service (Qos) Class Identifier (QCI).

The P-GW 40 hosts the following functions:

UE IP address allocation and IP anchor point;

Per-user based packet filtering (e.g., by means of deep packet inspection);

Lawful interception;

Downlink and uplink service level charging, gating and rate enforcement.

Figure 2:
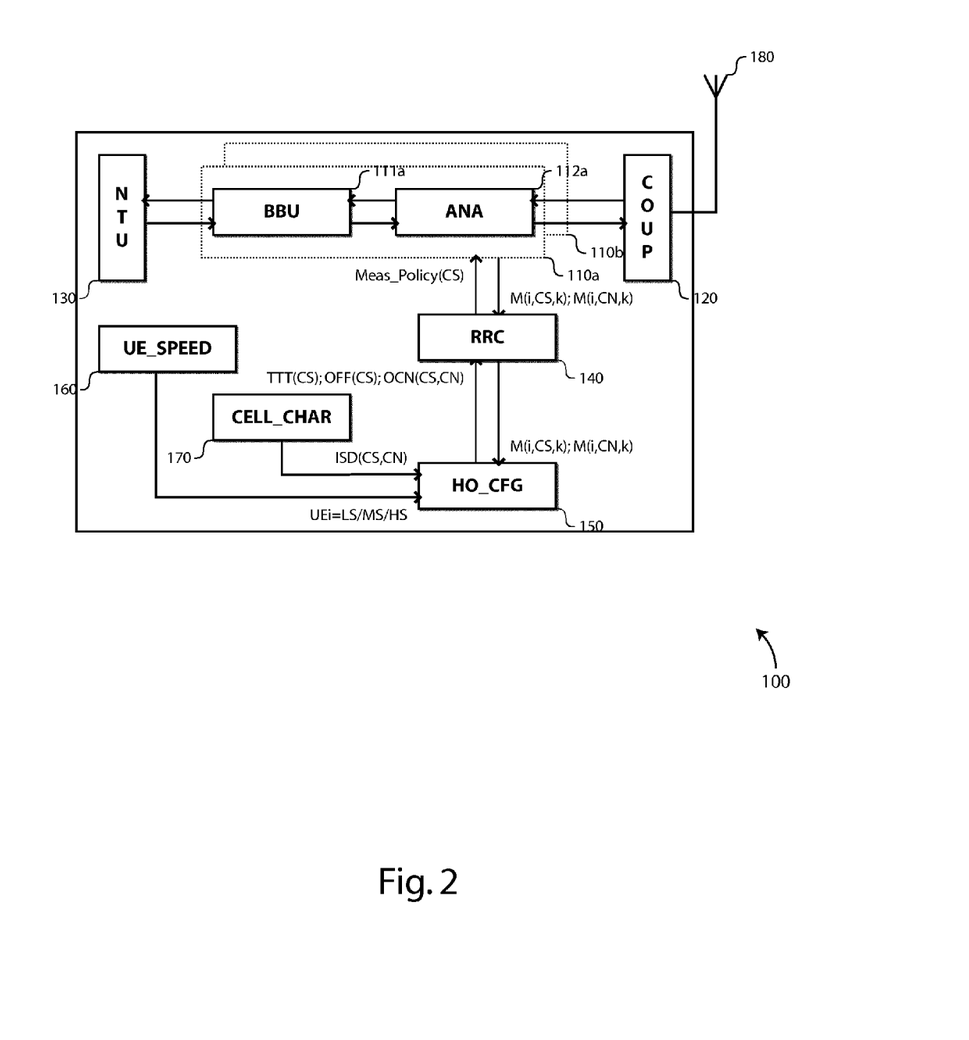
FIG. 2 represents a radio access node as per the present invention.

There is seen in FIG. 2 further details about an eNB 100 as per the present invention, and configured to operate one or more serving cells.

The eNB 100 comprises the following functional blocks:
one or more transceivers 110, each one comprising a digital base-band unit 111 (or BBU) and an analog band-pass unit 112 (or ANA);
a coupling unit 120 (or COUP);
a network termination unit 130 (or NTU);
a radio resource controller 140 (or RRC);
a handover configuration agent 150 (or HO_CFG) for determining optimal values for the handover parameters to be passed to the UEs and/or to the radio resource controller 140 for handover condition detection;
a UE speed characterization unit 160 (or UE_SPEED);
a cell characterization unit 170 (or CELL_CHAR); and
an antenna 180.

The network termination unit 130 is coupled to the digital base-band unit 111, the digital base-band unit 111 is coupled to the analog band-pass unit 112, the analog band-pass unit 112 is coupled to the coupling unit 120, and the coupling unit 120 is coupled to an external or internal antenna 180. The radio resource controller 140 is coupled to the transceivers 110. The handover configuration agent 150 is coupled to the radio resource controller 140. The UE speed characterization unit 160 and the cell characterization unit 170 are coupled to the handover configuration agent 150.

The transceivers 110 are configured to establish and operate radio communication channels with UEs under control of the radio resource controller 140.

The digital base-band unit 111 is for digitally processing the received and transmit data symbols. The digital base-band unit 111 implements the necessary protocol suites for issuing, terminating or relaying data and control packets.

The analog band-pass unit 112 is for modulating, amplifying and shaping the transmit signal that ultimately feds the antenna 180, and for filtering, amplifying with as little noise as possible and demodulating the received signal from the antenna 180. The analog band-pass 112 unit can be merged with the digital base-band unit, or can be moved closer to the antenna in a so-called Remote Radio Head-end (RRH) configuration.

The coupling unit 120 is for combining and passing the transmit signals from the transceivers 110 towards the antenna 180, and for dispatching the receive signal from the antenna 180 towards the transceivers 110.

The network termination unit 130 accommodates the appropriate Medium Access Control (MAC) and Physical transport (PHY) layers for communication through a PDN, as well as some frame dispatching logic for routing the incoming/outgoing frames towards the appropriate Input/Output (I/O) ports.

The radio resource controller 140 is for assigning and managing downlink and uplink radio resources used by the transceivers 110 and the respective UEs for radio communication over the air interface, that is to say a set of time and/or frequency resources assigned to a serving cell operated by the eNB 100 for transport of user or control traffic within that serving cell. More noticeably, the radio resource controller 140 makes decisions for outgoing handovers from the current serving cell towards a more suitable neighboring cell based on the UE measurement reports.

The radio resource controller 140 is for further configuring an ad-hoc measurement policy within the one or more serving cells operated by the eNB 100 (see "Meas_Policy (CS)" in FIG. 2).

More specifically, the UEs are configured with a trigger criteria for reporting the cell measurements to the eNB 100. In particular, during a preliminary sensing phase, the UEs are configured to periodically report the receive power or quality of the serving cell and of one or more best neighboring cells at a given reporting interval. When the learning phase completes and enough measurement samples have been gathered for good statistical characterization, the UEs are then configured to trigger measurement reporting only upon fulfillment of a particular handover condition, as typical in LTE networks.

The cell measurement data gathered during the sensing phase are held in a local data repository for further retrieval by the handover configuration agent 150 (see "M(i,CS,k); M(i,CN,k)" in FIG. 2), along with further measurement context data such as the UE identity, the UE speed category, the UE location, the time-of-the-day the measurements took place, the user device manufacturer, etc.

The UEs are also configured with one or more handover conditions for detecting that a given neighboring cell is a more suitable candidate cell for radio communication.

For instance, the UEs can be configured with an A3 handover condition (neighboring becomes offset better than serving) that comprises an hysteresis value HYS, a TTT value, a generic offset value OFF, and possibly cell-specific offset values OCN to manage specificities towards particular neighboring cells. The values of these parameters are directly obtained from the handover configuration agent 150. A so-configured UE reports an A3 measurement event whenever the received power of a reference signal from a neighboring cell is measured as being better than the receive power of a reference signal from the serving cell by the offset amount OFF—possibly increased or decreased by the cell individual offset OCN—and for TTT seconds. The hysteresis HYS prevents excessive toggling between the A3 entering and leaving condition.

The Entering and Leaving A3 conditions are defined by the following inequalities:

$$Mn+OCN-HYS>Ms+OFF \qquad (1; \text{Entering Condition}),$$

$$Mn+OCN+HYS<Ms+OFF \qquad (2; \text{Leaving Condition}),$$

Wherein Mn (respectively Ms) denotes the Layer 3 (L3) filtered Reference Signal Receive Power (RSRP) from the neighbor (respectively serving) cell.

The handover configuration agent 150 is for processing the UE measurement reports so as to determine optimal values for handover parameters used for handover detection within the one or more serving cells operated by the eNB 100. The so-determined handover parameter values are returned to the radio resource controller 140 for proper configuration of the handover conditions (see "TTT(CS); OFF(CS); OCN(CS,CN)" in FIG. 2).

The UE speed characterization unit 160 is configured to characterize a particular UE as belonging to a particular speed class, e.g. low/medium/high-speed class (LS/MS/HS) by comparing the UE speed to respective speed thresholds.

The UE speed characterization unit 160 may determine the UE speed category according to first speed information supplied by the UE (e.g., as estimated from GPS positioning data), and/or according to second speed information determined by the eNB 100 (e.g., the Doppler frequency shift is indicative of the radial UE speed with respect to the eNB 100), and/or according to third speed information relayed by a source eNB during an incoming handover procedure (e.g., as derived from the time spent in previous visited cells, or as explicitly encoded by the source eNB).

The respective UE speed categories are passed to the handover configuration agent 150 as possible inputs to the optimization algorithm (see "UEi=LS/MS/HS" in FIG. 2).

The neighboring cell characterization unit 170 is for determining Inter Site Distance (ISD) values between the one or more serving cells operated by the eNB 100 and their respective neighboring cells. The ISD values are either derived by characterization of the radio communication environment (possibly involving the UEs), or are field engineering data obtained from a network manager or from a network planning tool. The respective ISD values are passed to the handover configuration agent 150 as possible inputs to the optimization algorithm (see "ISD(CS,CN)" in FIG. 2).

Figure 3:
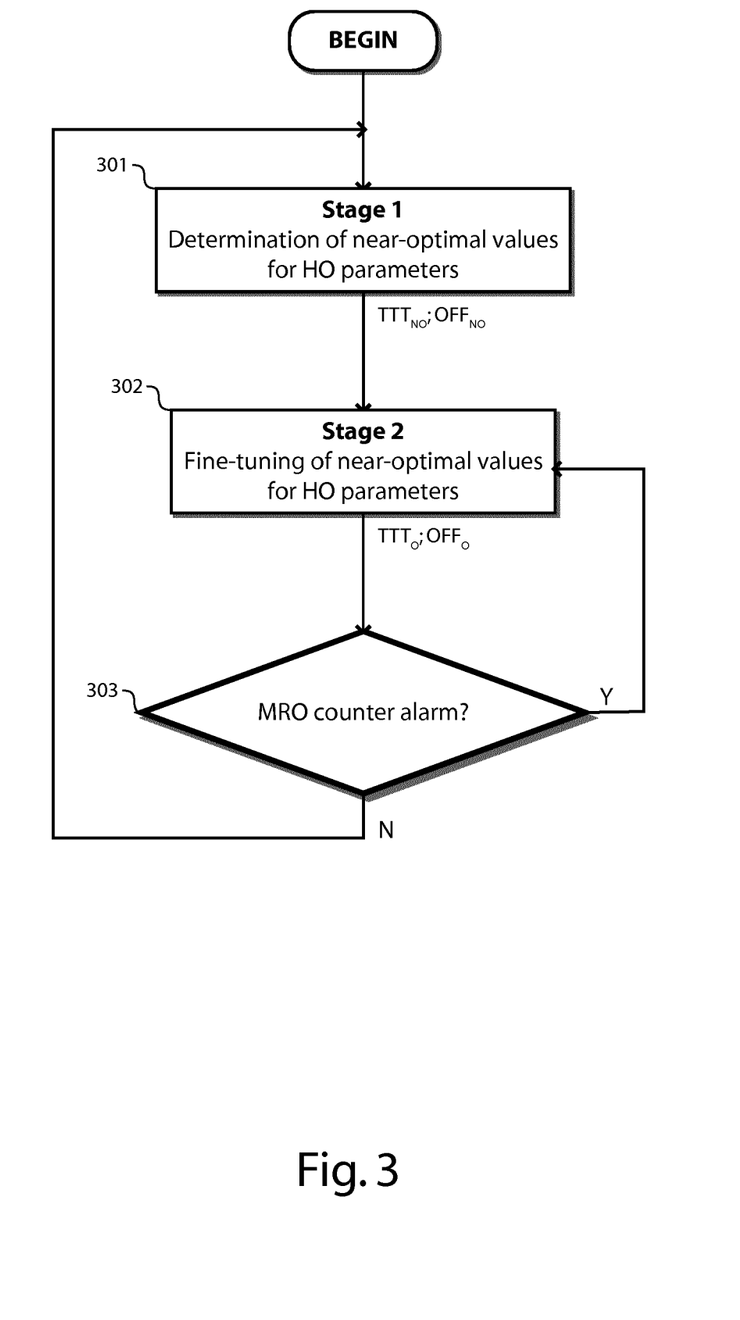
FIG. 3 represents an overview of the algorithm that is used for determining optimal values for the handover parameters.

FIG. 3 represents an overall description of the algorithm that is used within the handover configuration agent 150 for determining optimal values for the handover parameters, namely the handover parameters TTT and OFF.

The output of the first stage (see step 301 in FIG. 3) are the near-optimal values $TTT_{NO}$ and $OFF_{NO}$ for the handover parameters, which are the input of the optimisation phase in stage 2.

The second stage aims at fine-tuning the near-optimal values $TTT_{NO}$ and $OFF_{NO}$ to yield optimal values $TTT_o$ and $OFF_o$ for the handover parameters (see step 302 in FIG. 3).

A condition (alarm) can be added at this level to provoke a return to stage 1 when needed, e.g. when the performances in term of MRO counters are below a predefined threshold (see step 303 in FIG. 3).

[STAGE 1] The UEs perform L3-filtered RSRP measurements and report them to the serving eNB operating the serving cell they are attached to.

The latter processes the measurements and derives the initial joint configuration (TTT,OFF). Indeed, a joint configuration is necessary to capture the inter-dependency between these two parameters.

Optionally, the processing of the UE measurements can be made depending on the speed class of the UE (e.g., Small, Medium or High Speed classes) and/or the ISD, that is to say the distance separating the antenna sites of the serving and neighboring cells.

Intuitively, OFF shall account for the variance of the measurements. For example, small OFF values with strong fluctuations of measurements is likely to lead to false handover alarms.

Added to this, TTT is the duration of persistence of the handover condition. When the handover entering condition is true for one time sample, the condition has to remain verified even if measurements fluctuate. So, TTT is directly linked to how the measurements are spread around their mean values: the variance.

In the present invention, OFF is computed from the variance of measurements that are estimated over the TTT window size. The latter corresponds to the minimum duration over which the variance is stabilized to a steady value.

[TTT configuration in stage 1] Let $\{UE_i\}_{i=1}^N$ denote the ensemble of UEs successively attached to a given serving cell CS over the course of time.

Let $M(i,CS,k)$ and $M(i,CN,k)$ denote the L3-filtered RSRP measurements carried out by a given UE $UE_i$ for the serving cell CS and a neighbor cell CN (out of all the neighboring cells of the serving cell CS) at successive time instances k.

Let $\Delta(i,CN,k)$ denote the time-indexed difference between measurement samples of the serving cell CS and corresponding measurement samples of the neighboring cell CN as reported by the UE $UE_i$:

$$\Delta(i,CN,k)=M(i,CS,k)-M(i,CN,k) \quad (3).$$

Let $var_K\Delta$ be the variance of the difference $\Delta(i,CN,k)$ estimated over a time window comprising K measurement samples from a reference time index k0 onwards, wherein K denotes a positive integer value taken from the range $[K_{min}; K_{max}]$.

A possible unbiased estimator for the variance $var_K\Delta$ is:

$$Var_K\Delta(i, CN) = \frac{1}{(K-1)} \sum_{k=k0}^{k0+K-1} (\Delta(i, CN, k) - \overline{\Delta}_k(i, CN))^2, \quad (4)$$

wherein $\overline{\Delta}_k$ denotes the mean $\Delta$ value over K successive $\Delta$ values:

$$\overline{\Delta}_k(i, CN) = \frac{1}{K} \sum_{k=k0}^{k0+K-1} \Delta(i, CN, k). \quad (5)$$

Figure 4A:
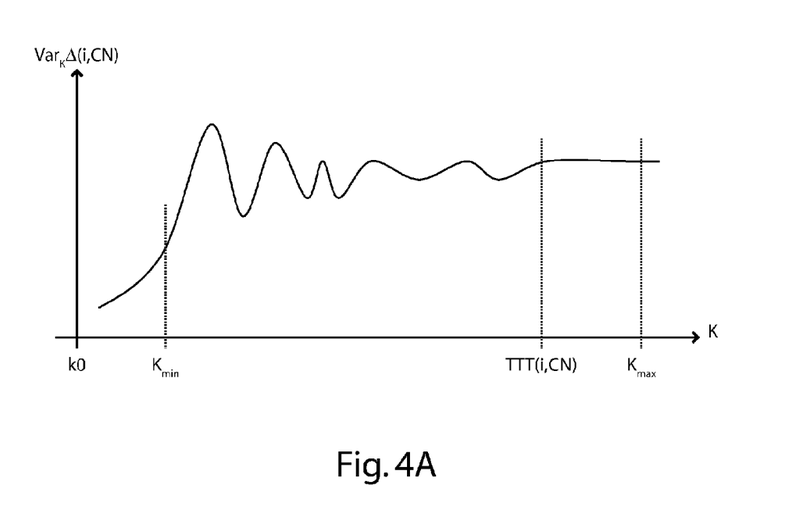
FIG. 4A represents a flow chart of computed variance values as a function of the time-window length.

Let $TTT(i,CN)$ be the minimum K value beyond which the variance $var_K\Delta$ lies within a given small interval around its asymptotic value. This is illustrated in FIG. 4A: $TTT(i, CN)$ is the minimum time window beyond which the variance $var_K\Delta$ gets substantially constant.

The aforementioned TTTi computation is re-iterated for further neighboring cells as measured by the UE $UE_i$, as well as for further attached UEs at various geographical positions within the serving cell CS, thereby yielding a statistical ensemble $\{TTT(i,CN)\}_{i,CN}$.

Figure 4B:
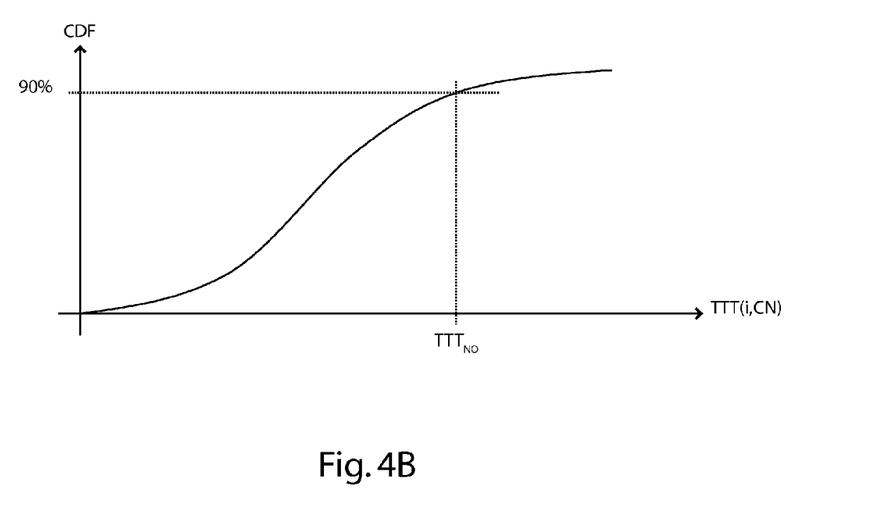
FIG. 4B represents a flow chart of the cumulative distribution function of the optimal TTT values determined for the respective Ues.

The near-optimal value $TTT_{NO}$ for TTT parameter is then derived from the statistics over the statistical ensemble $\{TTT(i,CN)\}_{i,CN}$. For example, and as illustrated in FIG. 4B, it is obtained from the Cumulated Density Function (cdf) at 90%:

$$TTT_{NO}=CDF_{90\%}\{TTT(i,CN)\}_{i,CN} \quad (6).$$

[Offset configuration in stage 1] The proposed algorithm relies on an interesting property of one change detection in a Page Hinkley test. Indeed, the Page Hinkley test detects abrupt changes in signal or systems with applications such as monitoring (detection of changes in vibrating modes which diagnosis systems anomaly), detection of bordering lines in video, segmentation in speech with detection of start and end of events.

The proposed algorithm applies this change detection test to the handover detection. Indeed, handover decision should be ideally triggered as soon as the signal received from the neighbor cell exceeds the signal from the serving cell by a given handover margin. Change detection comes to detecting a change in mean values of the difference between $M(i,CS,k)$ and $M(i,CN,k)$.

We recall that we aim at optimizing the two conflicting performance objectives:
minimizing the delay R before actually detecting the change (delay separating the effective change and the decision time); while
maximizing the duration F between two False Alarms.

In practice, we target tests that are optimal in that they minimize R for a given F value.

The Page Hinkley method is optimal in that sense, with the powerful and quite simple following property:

$$R = \frac{2\sigma^2}{v^2} \text{Log} F, \quad (7)$$

wherein v denotes the difference in mean values of the observations before and after the change,
and wherein $\sigma^2$ denotes a nominal variance value of the observations supposed invariant before or after change.

In the context of handover, R is the delay separating the instant the neighboring cell is detected offset-better than the serving cell and the instant the handover decision is made. Minimizing R comes to minimizing the risk of Too Late HO; and maximizing F comes to minimizing the risk for Too Early HO and HO to Wrong Cells.

The near-optimal value $OFF_{NO}$ for OFF parameter is then derived from Equation (6) with the simple formula:

$$OFF_{NO}=\sigma \cdot \sqrt{2 \cdot \text{Log}(F_{HO}/R_{HO})} \quad (8),$$

wherein $F_{HO}$ denotes the target maximum duration that can be tolerated between two HO failures of type HO Too early or HO To wrong cells,
and wherein RHO denotes the upper bound on the detection duration (distance from the frontier between 2 cells and the actual Handover Decision) that shall occur before the users cross the cell boundary (otherwise handover fails because triggered too lately).

$R_{HO}$ is either set by the operator in such a way that users have completed their handover before crossing the cell boundary, or is estimated as the probable duration from the frontier between the cells and the cell boundary.

$\sigma^2$ is set to a nominal variance value derived from the statistics of the previously computed $var_K \Delta$ with K being set to the generic TTT value. For instance, $\sigma^2$ is set as the CDF at 90% of the statistical ensembles $\{var_{TTT}\Delta(i,CN)\}_{i,CN}$.

Inter-dependence between OFF and TTT parameters is thus captured by the fact that OFF is computed from the variance over TTT window: TTT is derived from the variance of the measurements on a set of possible window sizes; this variance estimated over TTT is then injected as input to an Offset module for the estimation of OFF parameter.

The determination of TTT parameter can be instantiated on a per speed class basis, in which case the ensemble $\{UE_i\}_{i=1}^N$ only refers to UEs that have been characterized as belonging to a given speed class.

Similarly, the determination of the offset parameter can be instantiated on per speed class basis and on per neighbor cell basis. Only the measurements of a given neighboring cell and from UEs of a given speed class are now considered. The generic OFF value is then set to a default value, and one adjusts the actual offset value used for a given neighboring cell by playing with the cell specific offset parameter OCN (positive or negative value).

The ISD between the serving cell and the given neighboring cell may also be considered for appropriately adjusting RHO value. Indeed, a user terminal that moves at a high speed from a serving cell to a neighbor cell stays a short time in the critical area (the overlapping area). The duration for deciding about a handover shall be short, and so shall be RHO.

A generic formulation of the Page Hinkley test is now set forth.

Let $\{y1, \ldots, yK\}$ denote K observation samples of a signal. The objective is to detect if there has been a change in the sequence of observations. Let yr denote the sample corresponding to this change.

Let p0 denote the Probability Density Function (PDF) before the change, and let p1 denote the PDF after the change.

This can be written as:

H0 (no change) $yk\epsilon p0$; $1 \leq k \leq K$,

H1 (change at sample r) $yk\epsilon p0$; $1 \leq k \leq r-1$, and $yk\epsilon p1$; $r \leq k \leq K$.

The general decision rule based on Maximum Likelihood principles can be derived in the following way:

$$\prod_{k=r}^{K} \frac{p1(yk)}{p0(yk)} \begin{array}{c} H1 \\ > \\ < \\ H0 \end{array} \eta. \quad (9)$$

This test is then applied to the detection of a jump in the mean value from $\mu 0$ to $\mu 1$ for normal observations with fixed variance. Let:

$$S_{k1}^{k2}(\mu 0, v) := v\sum_{k=k1}^{k2} \left(yk - \mu 0 - \frac{v}{2}\right). \quad (10)$$

If we consider a sequential process with observations from index 1 to sliding index K (instead of fixed K), it is demonstrated that the detection of jump in the mean of the signal occurs if:

$$S_1^k(\mu 0, v) - \min_{1 \leq k \leq K}(S_1^k(\mu 0, v)) > \eta. \quad (11)$$

Let the observations sequence set be the time-indexed difference between the RSRP of the serving cell CS and the RSRP of the neighbor cell CN:

$$yk:=\Delta(i,CN,k) \quad (12).$$

Handover is detected if equation (11) is verified with $\mu 0=0$ and v is the handover offset OFF.

[STAGE 2] The second stage is a closed-loop optimization algorithm initialized with the parameter values ($TTT_{NO}$, $OFF_{NO}$) as computed during the first stage. The idea consists in adjusting (incrementing or decrementing) the parameter values ($TTT_{NO}$,$OFF_{NO}$) depending on the experienced MRO counters.

A possible implementation for the second stage is set forth here below based on the Simulated Annealing (SA) approach.

SA is a meta heuristic technique for solving a global optimization problem. It consists in iteratively perturbing some sub optimal solution towards a better one. The main advantage of SA is that it can deal with non linear, non differentiable problems with many local optima and requires very few assumptions.

SA is based on an analogy with the annealing process in metallurgy. Annealing consists in a controlled process of heating then cooling before freezing the metal in order to achieve the desired material properties: hardness or flexibility properties. By analogy, in optimization by simulated annealing, when the temperature is high, large bounces from one state to another is tolerated. When temperature gets low, less and less random movement from one state to another is tolerated and the system is stabilized to the final frozen state (the optimal one).

In the literature, optimization by SA is often compared to a bouncing ball that can bounce over mountains from valley to valley. At the beginning of the optimization process by SA, high temperatures lead to large bounces over mountains and valleys. When the temperature decreases, the ball cannot bounce high then it is trapped in a smaller range of valleys, around the optimum.

During the high temperature phase, the solution moves out of (escape from) local optima. Fine search of the optima is achieved at lower temperature.

Figure 5:
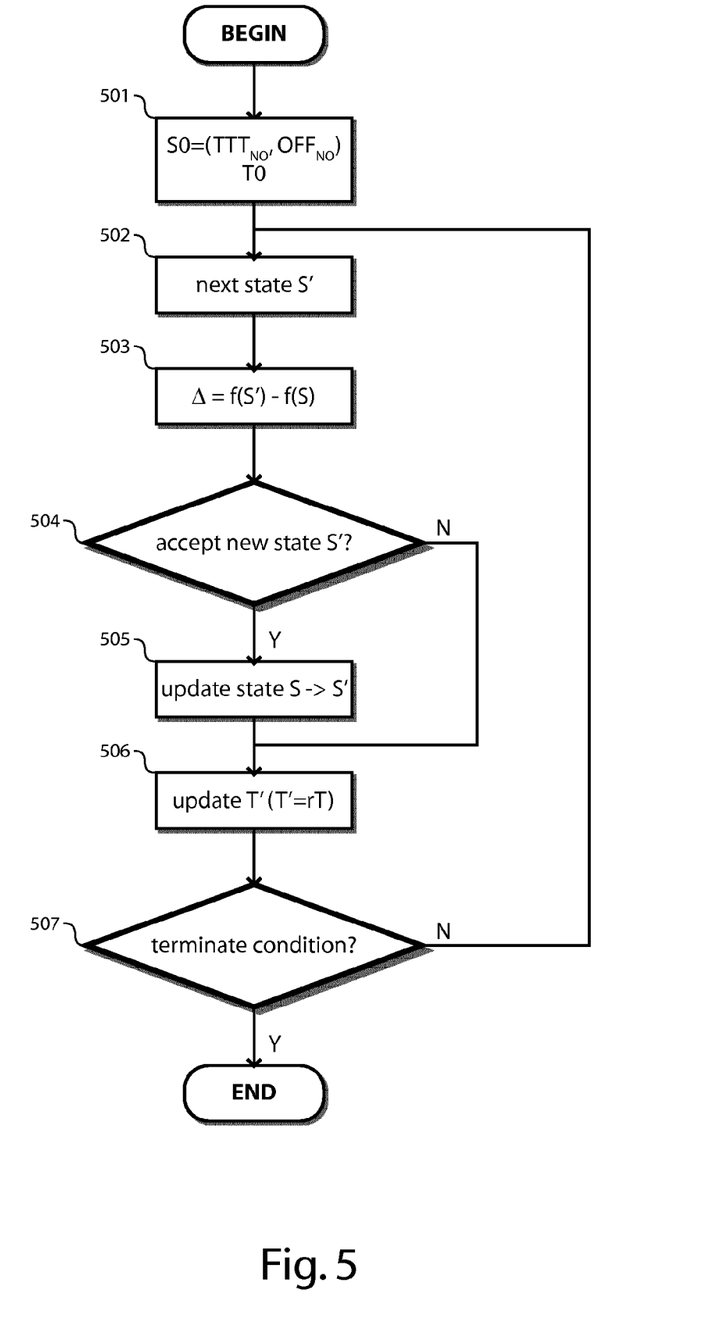
FIG. 5 represents an overview of the SA algorithm that is used for fine-tuning the handover parameter values.

The SA applied to the iterative optimization of handover parameters is depicted in FIG. 5.

In step 501, he algorithm is initialized with state S0= ($TTT_{NO}$,$OFF_{NO}$) as determined by the first stage. Temperature is set-up to a high value $T_0$. The temperature cooling rate is r.

The objective function is $f=HO_L+HO_{E\&W}$ (respectively HO Too late ratio and HO Too Early plus HO To Wrong cell ratio)

In step 502, a new state S' is selected. Optionally, the state selection process shall account for performances obtained with S state, i.e. $HO_L(S)$ and $HO_{E\&W}(S)$ ratios. For example: If $HO_L(S)>$Max_Threshold then $S'=S-(\lambda,\beta)$.

In step 503, the difference between the objective function of the new state S' and the objective function of the former state S is determined:

$$\Delta=f(S')-f(S) \tag{13}$$

In step 504 and 505, if the objective function has decreased on state S', then the new operating point S' is selected for the upcoming trial, else it is accepted with a given probability that is temperature-dependent (e.g., $p=\exp(-\Delta/T)$ is the probability the new state S' is accepted if the objective function has increased). At high temperatures, the new state can be accepted even with high $\Delta$ variations. At low temperatures, when the search of the optimum is performed more locally, the new state S' is accepted only with small $\Delta$ variations.

In step 506, the temperature is adjusted. Many variants of cooling schedule can be envisaged, such as T'=rT.

In step 507, if the stopping conditions are met, then current state S can be frozen. It is the optimum solution; else, go to step 502.

The second stage can also be initialized by any other method, heuristically initial configuration or simply randomly. This will impact the convergence duration.

Although the above description focuses on LTE networks and related architecture and terminology, it may similarly applies to other mobile technologies such as Universal mobile Terrestrial System (UMTS) and Global System for mobility (GSM). The distribution of the functional units depicted in FIG. 2 over the various network elements may vary from one technology to the other. For instance, the radio resource controller 140 and related handover configuration agent 150 typically form part of an RNC for UMTS, or of a BSC for GSM. The signal characteristics that are being measured by the mobile stations and that are used by the handover optimization algorithm may also vary from one technology to the other. For instance, the Receive Signal Code Power (RSCP) or Reference Signal Receive Quality (RSRQ) may be used in lieu of the present RSRP.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A method for jointly adjusting Time-To-Trigger (TTT) and offset handover parameters used for handover detection within a given serving cell, the method comprising:
receiving, during a preliminary sensing phase and from a plurality of mobile stations served by the serving cell, measurement samples of the serving cell and of respective neighboring cells carried out by the respective mobile stations at successive and regular time instances, the measurement samples being indicative of the respective strengths or qualities of pilot signals received by the respective mobile stations from the respective serving and neighboring cells, determining delta values indicative of the time-indexed difference between respective ones of the measurement samples of the serving cell and corresponding ones of the measurement samples of the neighboring cells; and
determining near-optimal values for the handover parameters by statistical characterization of the ensembles of delta values for the plurality of mobile stations.

2. The method according to claim 1, wherein the method further comprises inputting the near-optimal values to an iterative closed-loop optimization algorithm in order to determine optimal values for the handover parameters.

3. The method according to claim 2, wherein the iterative closed-loop optimization algorithm is based on a simulated annealing algorithm.

4. The method according to claim 1, wherein the plurality of mobile stations belongs to a particular speed class, and wherein the near-optimal values for the handover parameters are determined on per speed class basis.

5. The method according to claim 1, wherein the statistical characterization of the ensembles of delta values for the plurality of mobile stations involves the characterization of variances of the delta values for respective ones of the plurality of mobile stations over varying time windows.

6. The method according to claim 5, wherein the method further comprises, for respective ones of the plurality of mobile stations, and from a given time index onwards, estimating variance values over a time-window of K successive delta values for respective increasing K values, and determining a minimum time-window length beyond which the so-determined variance values lies within a given small interval, and wherein the method further comprises determining a Time-To-Trigger TTT value, during which measurement samples of the serving cell and a given target cell shall fulfill a given handover condition, by statistical characterization of the so-determined minimum time-window lengths for the plurality of mobile stations.

7. The method according to claim 6, wherein the so-determined TTT value is such that a given proportion of the so-determined minimum time-window lengths for the plurality of mobile stations are lower than or equal to the TTT value.

8. The method according to claim 6, wherein the method further comprises determining a nominal variance value by statistical characterization of the so-estimated variance values, and inputting the so-determined nominal variance value, along with a first upper bound for a handover detection time and a second upper bound for a false handover detection rate, to a Page Hinkley statistical test so as to determine an offset value whereby the target cell shall be measured offset-better than the serving cell for the handover condition to be fulfilled.

9. The method according to claim 8, wherein the nominal variance value is determined such that a further given proportion of the variance values estimated for the plurality of mobile stations over time-windows of lengths equal to the TTT value are lower than or equal to the nominal variance value.

10. The method according to claim 4, wherein the determination of the offset value is instantiated on a per neighboring cell basis, and wherein the first upper bound is adjusted based on an inter-site distance between the serving and a given neighboring cell and on the particular speed class.

11. A configuration agent for jointly adjusting Time-To-Trigger (TTT) and offset handover parameters used for handover detection within a given serving cell, and configured:

to receive, during a preliminary sensing phase and from a plurality of mobile stations served by the serving cell, measurement samples of the serving cell and of respective neighboring cells carried out by the respective mobile stations at successive and regular time instances, the measurement samples being indicative of the respective strengths or qualities of pilot signals received by the respective mobile stations from the respective serving and neighboring cells, to determine delta values indicative of the time-indexed difference between respective ones of the measurement samples of the serving cell and corresponding ones of the measurement samples of the neighboring cell; and to determine near-optimal values for the handover parameters by statistical characterization of the ensembles of delta values for the plurality of mobile stations.

12. A radio access node comprising a configuration agent according to claim 11.

13. A radio access controller comprising a configuration agent according to claim 11.

14. A network manager comprising a configuration agent according to claim 11.

15. A non-transient computer readable medium carrying instructions which when executed by at least one processor provide a configuration agent for jointly adjusting Time-To-Trigger (TTT) and offset handover parameters used for handover detection within a given serving cell, the processor thereby being configured:

to receive, during a preliminary sensing phase and from a plurality of mobile stations served by the serving cell, measurement samples of the serving cell and of respective neighboring cells carried out by the respective mobile stations at successive and regular time instances, the measurement samples being indicative of the respective strengths or qualities of pilot signals received by the respective mobile stations from the respective serving and neighboring cells, to determine delta values indicative of the time-indexed difference between respective ones of the measurement samples of the serving cell and corresponding ones of the measurement samples of the neighboring cell; and to determine near-optimal values for the handover parameters by statistical characterization of the ensembles of delta values for the plurality of mobile stations.

16. A radio access node comprising non-transient computer readable medium carrying instructions which when executed by at least one processor provide a configuration agent according to claim 15.

17. A radio access controller comprising a non-transient computer readable medium carrying instructions which when executed by at least one processor provide a configuration agent according to claim 15.

18. A network manager comprising a non-transient computer readable medium carrying instructions which when executed by at least one processor provide a configuration agent according to claim 15.

* * * * *